US007269797B1

(12) United States Patent
Bertocci et al.

(10) Patent No.: US 7,269,797 B1
(45) Date of Patent: Sep. 11, 2007

(54) MECHANISM TO ORGANIZE WINDOWS IN A GRAPHIC APPLICATION

(76) Inventors: Fabrizio Bertocci, 1819 Sheri Ann Cir., San Jose, CA (US) 95131; Victor Gavrilenko, 1511 Woodmeadow Ct., San Jose, CA (US) 95131

( * ) Notice: Subject to any disclaimer, the term of this patent is extended or adjusted under 35 U.S.C. 154(b) by 262 days.

(21) Appl. No.: 10/113,553

(22) Filed: Mar. 28, 2002

(51) Int. Cl.
G06F 3/048 (2006.01)

(52) U.S. Cl. ............... 715/783; 715/788; 715/799; 715/803; 715/804

(58) Field of Classification Search ........... 715/788, 715/799, 803, 804, 783
See application file for complete search history.

(56) References Cited

U.S. PATENT DOCUMENTS

| | | | | |
|---|---|---|---|---|
| 5,371,847 | A * | 12/1994 | Hargrove | 345/788 |
| 5,572,649 | A * | 11/1996 | Elliott et al. | 715/788 |
| 5,714,971 | A * | 2/1998 | Shalit et al. | 715/804 |
| 5,841,435 | A * | 11/1998 | Dauerer et al. | 345/775 |
| 5,886,694 | A * | 3/1999 | Breinberg et al. | 345/788 |
| 5,995,103 | A | 11/1999 | Ashe | |
| 6,043,817 | A * | 3/2000 | Bolnick et al. | 345/788 |
| 6,344,864 | B1 * | 2/2002 | Watanabe | 715/788 |
| 6,717,556 | B2 * | 4/2004 | Asahi et al. | 345/1.1 |
| 6,944,829 | B2 * | 9/2005 | Dando | 715/798 |
| 7,194,696 | B2 * | 3/2007 | Mori | 715/783 |
| 2002/0054141 | A1 * | 5/2002 | Yen et al. | 345/804 |

OTHER PUBLICATIONS

Microsoft Outlook, Copyright 2000.*
http://www.viewsonic.com/pdf/wp_dualmonitor.pdf, Copyright 2000. ViewSonic Corp.*

* cited by examiner

*Primary Examiner*—Weilun Lo
*Assistant Examiner*—Sara M. Hanne
(74) *Attorney, Agent, or Firm*—Scheinberg & Griner, LLP; Michael O. Scheinberg

(57) ABSTRACT

A method and system for organizing windows associated with an application are described. In one embodiment, a user command pertaining to multiple internal windows is received. The multiple internal windows are contained within a first frame controlled by an application. In response to the user command, a second frame controlled by the application is opened. Further, one or more of the multiple internal windows are moved to the second frame. In one embodiment, the internal windows are moved to the second frame in response to an operation performed by a user (e.g., a drag-and-drop operation). Alternatively, the internal windows are moved to the second frame automatically based on a criterion controlling the organization of the internal frames.

34 Claims, 10 Drawing Sheets

FIG. 5

MECHANISM TO ORGANIZE WINDOWS IN A GRAPHIC APPLICATION

FIELD OF THE INVENTION

The present invention relates to presentation of data on a computer screen and more specifically to organizing windows in a graphic application.

BACKGROUND OF THE INVENTION

A computer system typically includes a monitor having a display screen for presenting information, such as text and images, to the user. The display screen can be configured into a window environment in which separate areas of the display screen, called windows, are used to present information to the user, to display information entered by the user or to interact with the user. Each window, which is typically rectangular in shape, can present or represent different information or different views of the same information. The window may include various features such as a menu bar, tool bar, status bar, etc. An example of a popular software system that employs window environment is the Windows™ 2000 operating system, which is commercially available from Microsoft™ Corporation.

In a window environment, an application program executing on the computer system defines a set of windows that are associated with that application. Typically, these windows are displayed within a single container (also known as a frame) that includes user interface features of the application. Users can usually request a horizontal, vertical or cascade arrangement of windows within the frame to achieve better visibility of the windows and more convenient access to the windows. However, the problem with window visibility and access still exists for the application that permit the users to open a large number of windows at the same time. One example of such an application is a debugging application that allows a software developer to debug a software program running in a multi-core (one target with several processors) or multi-target (several targets are connected in a certain way) environment. That is, the user may need to open simultaneously a window to view source code, a set of windows to view internal registers of each processor, a set of windows to view stack data associated with each active function within the program code, etc. This large number of windows overloads the screen, making it difficult to provide convenient access to each window positioned within the frame.

SUMMARY OF THE INVENTION

A method and system for organizing windows associated with an application are described. In one embodiment, a user command pertaining to multiple internal windows is received. The multiple internal windows are contained within a first frame controlled by an application. In response to the user command, a second frame controlled by the application is opened. Further, one or more of the multiple internal windows are moved to the second frame. In one embodiment, the internal windows are moved to the second frame in response to an operation performed by a user (e.g., a drag-and-drop operation). Alternatively, the internal windows are moved to the second frame automatically based on a criterion controlling the organization of the internal frames.

Other features of the present invention will be apparent from the accompanying drawings and from the detailed description which follows.

BRIEF DESCRIPTION OF THE DRAWINGS

The present invention is illustrated by way of example, and not by way of limitation in the figures of the accompanying drawings in which like reference numerals refer to similar elements.

FIGS. 3-6, 7A and 7B illustrate representations of exemplary user interfaces generated according to some embodiments of the present invention.

DETAILED DESCRIPTION

Figure 1:
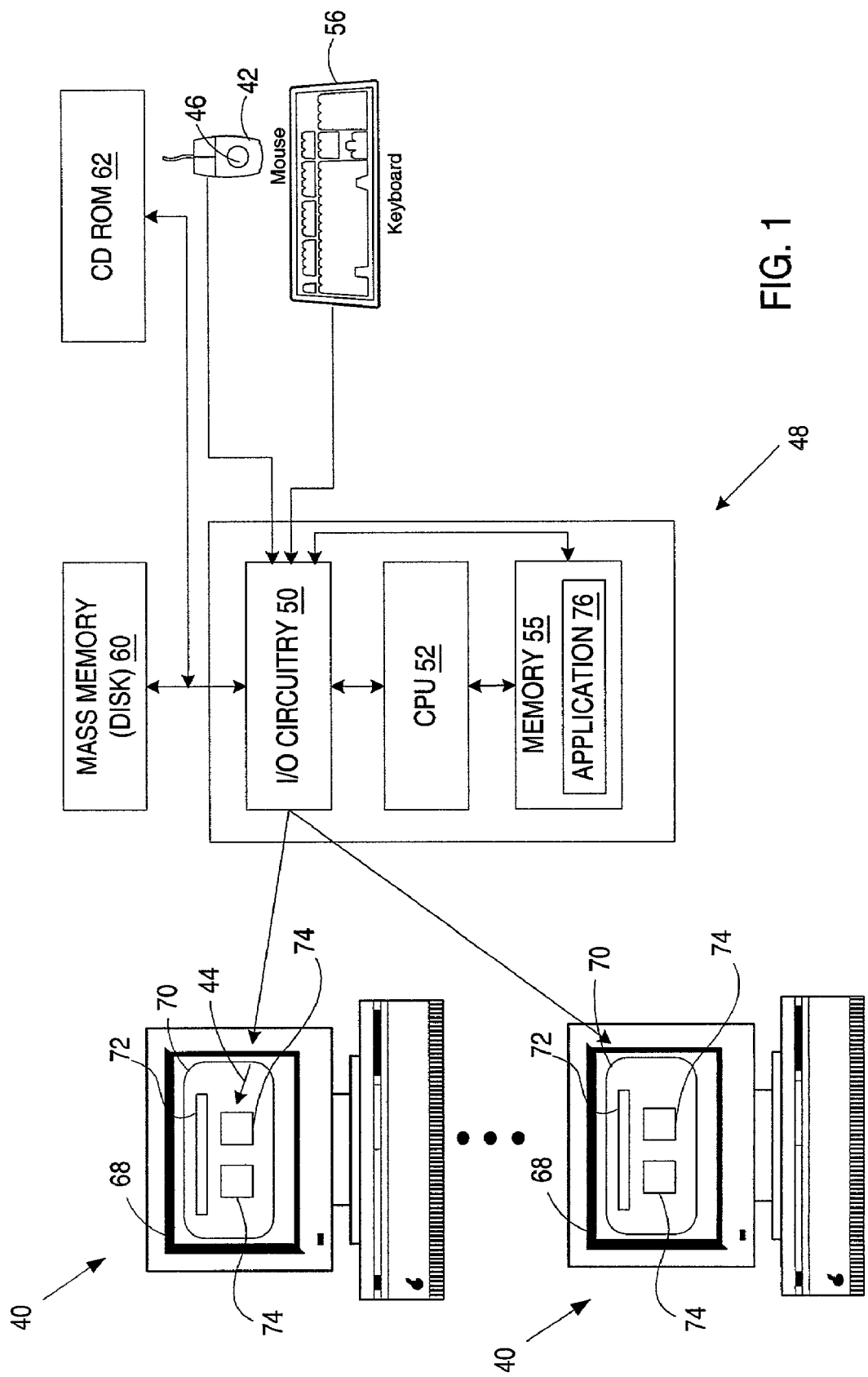
FIG. 1 is a block diagram of a digital processing system in which windows associated with an application may be organized in accordance with one embodiment of the present invention.

A method and system for organizing windows associated with an application are described. In the following detailed description of the present invention, numerous specific details are set forth in order to provide a thorough understanding of the present invention. However, it will be apparent to one skilled in the art that the present invention may be practiced without these specific details. In some instances, well-known structures and devices are shown in block diagram form, rather than in detail, in order to avoid obscuring the present invention.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

FIG. 1 is a block diagram of a digital processing system in which windows associated with an application may be organized in accordance with one embodiment of the present invention. The digital processing system includes one or more display devices 40, such as CRT monitors or liquid crystal displays (LCD), plasma displays, or other type of display devices. The digital processing system further includes a cursor control device 42, such as a mouse, a track ball, joy stick, touchpad or other device for selectively positioning a cursor 44 on a display screen 68 of any display device 40. Typically, the cursor control device 42 includes a signal generation means, such as a switch 46 (e.g., a mouse button, a mouse wheel, etc.) having a first position and a second position. The user of the digital processing system may use the switch 46 to generate signals directing the system to execute certain commands. As illustrated, the cursor control device 42 is coupled to a computer system 48.

The computer 48 comprises an input/output (I/O) circuit 50 which is used to communicate information in appropriately structured form to and from other portions of the computer 48. In addition, the computer 48 includes a central processing unit (CPU) 52 coupled to the I/O circuit 50 and a memory 55. These elements are those typically found in most general purpose computers, and in fact, computer 48 is intended to be representative of a broad category of data processing devices capable of generating graphic displays.

CPU 52 may represent one or more processors (e.g., microprocessors), and memory 55 may represent the random access memory (RAM) comprising the main storage of computer 48, as well as any supplemental levels of memory, e.g., cache memories, non-volatile or backup memories (e.g., programmable or flash memories), read-only memories, etc. In addition, memory 55 may be considered to include memory storage physically located elsewhere in computer 48, e.g., any cache memory in CPU 52, as well as any storage capacity used as a virtual memory, e.g., as stored on a magnetic mass memory 60, a CD ROM 62, or on another computer coupled to computer 48 via a network. Magnetic mass memory disk 60 is shown coupled to I/O circuit 50 to provide additional storage capability for the computer 48. In addition, CD ROM 62 is further coupled to the I/O circuit 50 for additional storage capacity. It will be appreciated that additional devices may be coupled to the computer 48 for storing data, such as magnetic tape drives, as well as networks, which are in turn coupled to other data processing systems.

Also shown in FIG. 1 is a keyboard 56 to input data and commands into the computer 48, as is well known in the art. As illustrated in FIG. 1, the display device 40 includes the display screen 68 in which one or more top-level windows 70 controlled by an application 76 running on the computer system 48 may be displayed according to some embodiments of the present invention. Each top-level window 70 (referred to herein as a frame) may include a menu bar 72 disposed horizontally across the length of the window and one or more internal windows 74 opened during the operation of the application 76. The application 76 is stored in memory 55 and executed by the CPU 52. As well known, the movement of the cursor control device 42 may be translated by the computer 48 into the movement of the cursor 44 on any of the display screens 70.

The system illustrated in FIG. 1 is intended to represent a general digital processing system capable of providing a graphical user interface display. It will be appreciated that the digital processing system represents only one example of a system, which may have many different configurations and architectures, and which may be employed with the present invention.

Figure 2:
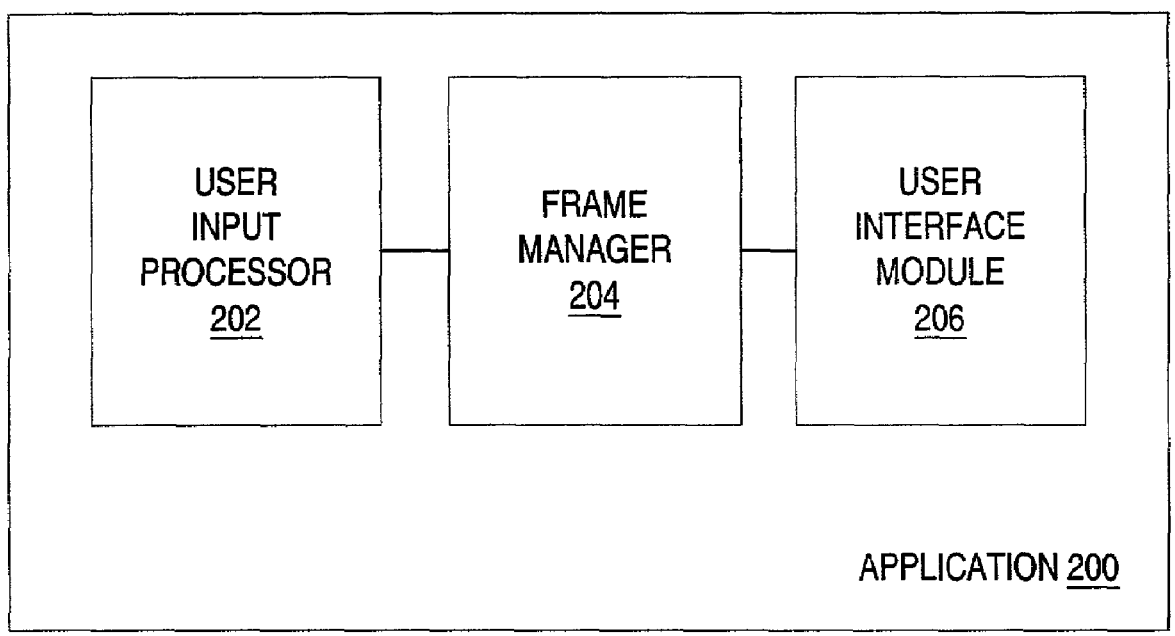
FIG. 2 is a block diagram illustrating one embodiment of an application controlling internal windows.

FIG. 2 is a block diagram illustrating one embodiment of an application 200 operating in the computer 48. The application 200 may be any software program that allows the user to open a large number of windows simultaneously. For example, the application 200 may be a debugger that allows a software developer to test the operation of a multi-core project, or publishing software that allows an editor to cut and paste information from different sources simultaneously. When a large number of windows are opened at the same time, the user may not be able to see all the windows and have a convenient access to them. The application 200 simplifies access to the windows and improves their visibility by placing the windows inside a group of frames and displaying a tree data structure representing the organization of the windows within the frames. These frames can be located on a single desktop and/or monitor. Alternatively, the frames can be located on multiple desktops, monitors and/or computers.

In one embodiment, the application 200 includes a user input processor 202, a frame manager 204, and a user interface module 206. The user input processor 202 is responsible for receiving user requests pertaining to the organization of internal windows associated with the application 200. The frame manager 204 is responsible for responding to the user requests by opening and closing frames and moving the internal windows between the frames. In one embodiment, the frame manager 204 displays a new frame in response to a user request to open a frame. Once the new frame is visible, the user may request to move an particular internal window from an existing frame to the new frame (e.g., by performing a drag-and-drop operation). In an alternative embodiment, the frame manager 204 opens one or more new frames and organizes the internal windows inside the new frames in response to a user request to organize the internal windows using a certain criterion. The criterion represents one of the properties associated with the internal windows. For example, when the application 200 is a debugger of a multi-core project, the criterion may be based on a project associated with the internal window, a target component for debugging, a connection open with the debugger, the type of a source file, the type of a debug window, etc.

The user interface module 206 is responsible for providing a graphical representation of window organization and enabling user interaction with the window organization. In one embodiment, the user interface module 206 displays a tree data structure, which represents the organization of the internal windows, in a window manager panel contained in one of the frames. The user can modify the organization of the internal windows by manipulating the nodes of the tree data structure (e.g., by dragging and dropping nodes representing the internal windows). In one embodiment, the window manager panel including the tree data structure can be moved from one frame to another in response to a user request.

Figure 8:
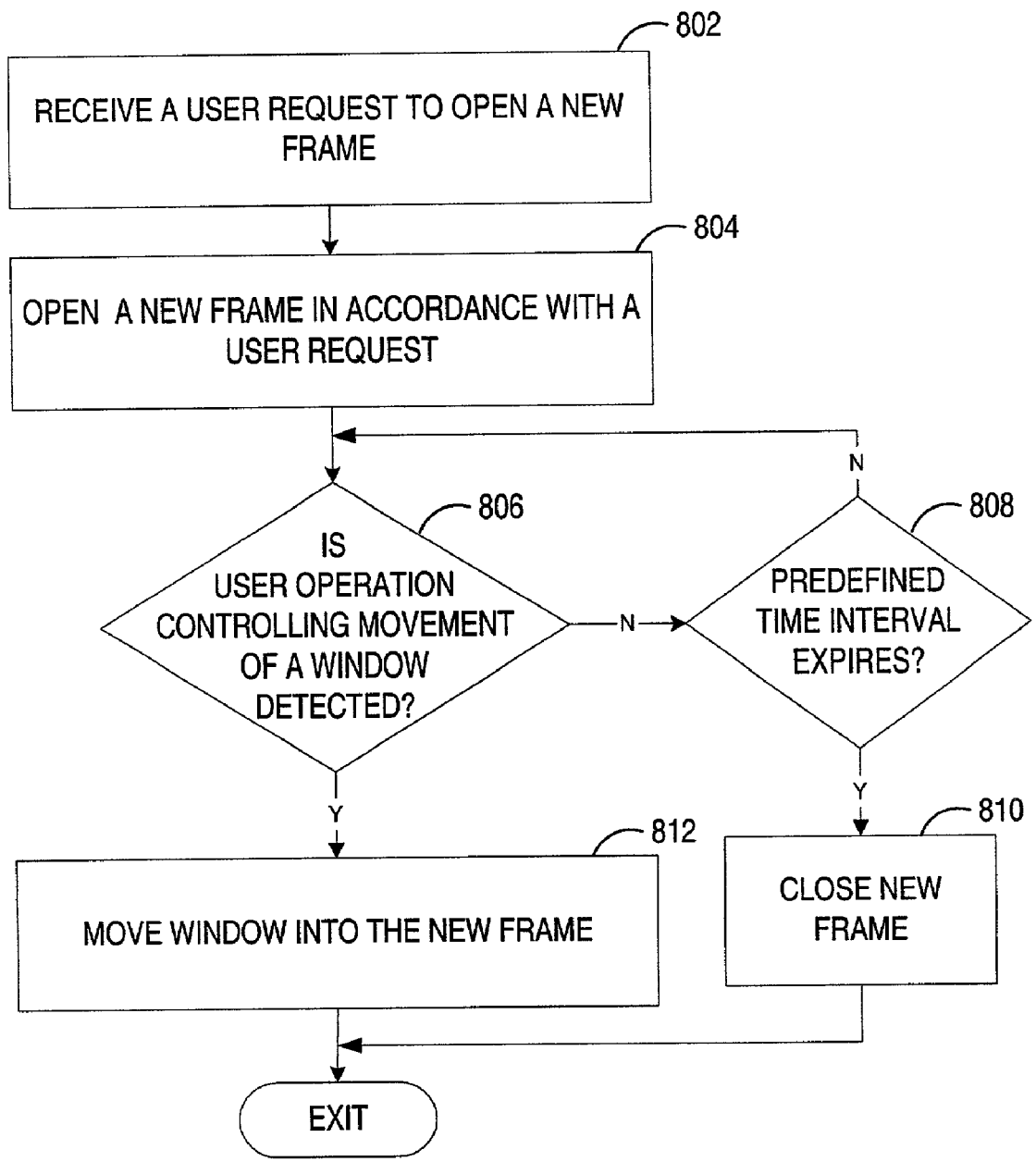
FIGS. 8 and 9 are flow diagrams of alternative embodiments of a method for organizing windows associated with an application.
Figure 9:
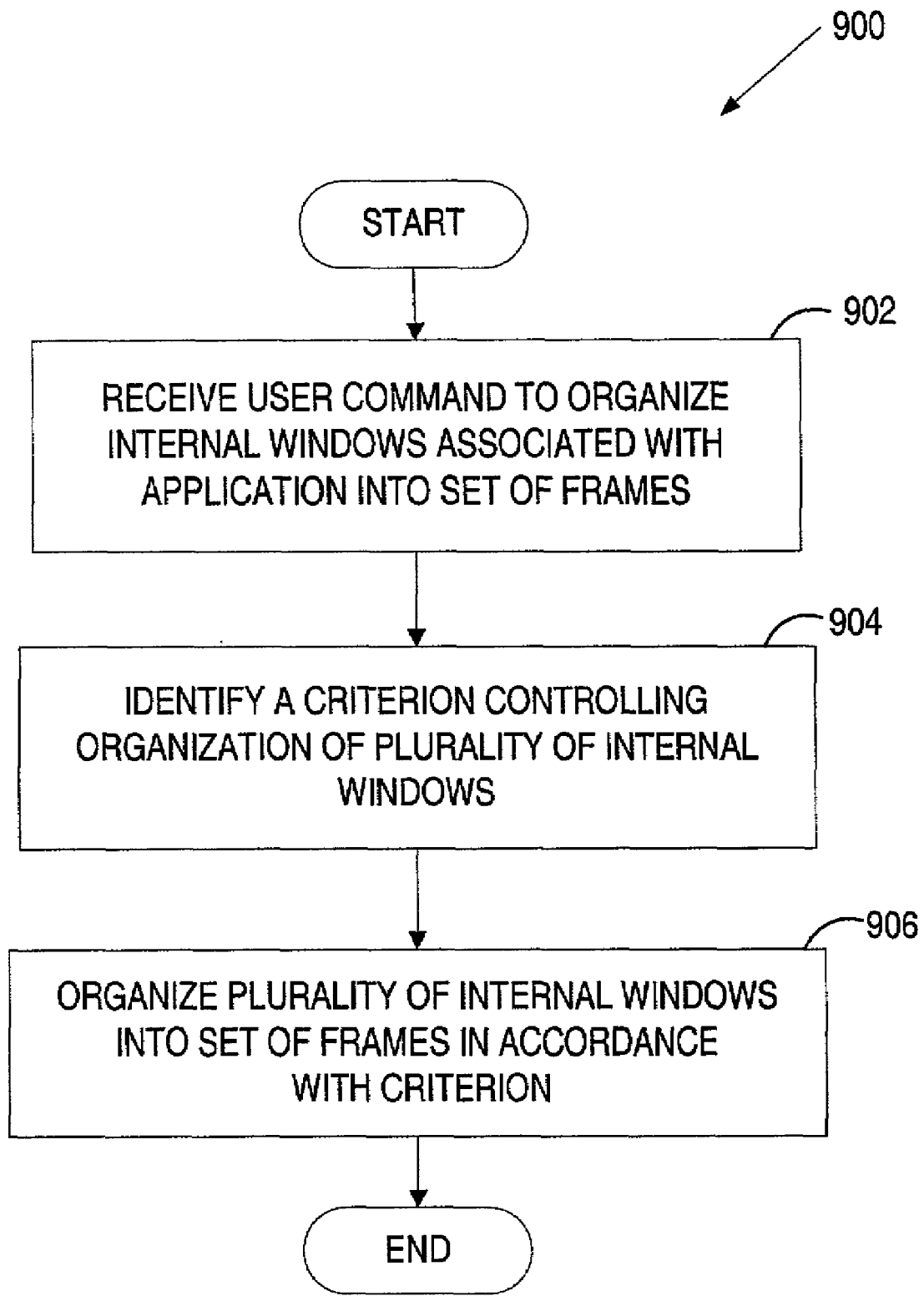

FIGS. 8 and 9 are flow diagrams of alternative embodiments of a method for organizing windows associated with an application.

Referring to FIG. 8, method 800 begins with receiving a user request to open a new frame (processing block 802). The user may issue the request using various user interface features that will be described in more detail below. In one embodiment, the user request specifies whether the new frame is to be opened on a different desktop, a different monitor, or a different computer.

At processing block 804, the new frame is opened in accordance with the user request. In one embodiment, the new frame includes the same set of user interface features (e.g., a menu bar, a tool bar, a status bar, etc.) as the existing frame.

Next, at decision box 806, a determination is made as to whether a user operation controlling the movement of an internal window to the new frame is detected. The operation may be a drag-and-drop operation with respect to the internal window, a manipulation of a node representing the internal window in a tree data structure, or any other designated operation. If the determination made at decision box 806 is negative, and the new frame remains empty during a predetermined time interval (decision box 808), the new frame is closed (processing block 810). Alternatively, if the user operation controlling the movement of the internal window is detected, the internal window is moved to the new frame (processing block 812). Subsequently, the user can move additional internal windows from the existing frame to the new frame or open other new frames and move internal windows inside these new frames. In one embodiment, window manager panels and output panels can also be moved between the frames in response to user requests.

Method 900 illustrated in FIG. 9 enables an automatic organization of internal windows according to one embodiment of the present invention.

Referring to FIG. 9, method 900 begins with receiving a user request to organize internal windows associated with an application into a set of frames (processing block 902). The user may issue the request using various user interface features that will be described in more detail below. In one embodiment, the user request specifies whether the frames are to be opened on different desktops, different monitor, or different computers.

Next, at processing block 904, a criterion controlling the organization of the internal windows is identified. The criterion represents one of the properties assigned to the internal windows by an application opening the internal windows. Criteria vary for different applications. For example, for a debugging application, a criterion may be based on a project associated with the internal window, a target component for debugging, a connection open with the debugger, the type of a source file, the type of a debug window, etc. In one embodiment, the criterion is specified by the user when the user issues the request. Alternatively, the criterion may be predetermined or specified by the user in advance.

Further, at processing block 906, the internal windows are organized into a set of frames in accordance with the criterion. If the number of opened frames is not enough to move all the internal windows, new frames are automatically created. Similarly, if the number of frames opened exceeds the necessary number of frames, the frames that are not needed are automatically closed. In one embodiment, each resulting frame has a title reflecting the frame's value of the criterion used for the organization of the internal windows. In one embodiment, the original organization of the internal windows can be restored upon receiving an undo command from the user. In one embodiment, once the internal windows are organized, a tree data structure displayed on a window manager panel is updated to reflect the new organization. In one embodiment, any window opened by the user subsequent to the new organization will be automatically placed into an appropriate frame using the criterion identified at processing block 904.

FIGS. 3-6, 7A and 7B illustrate representations of exemplary user interfaces generated by the application 200, according to embodiments of the present invention.

Figure 3:
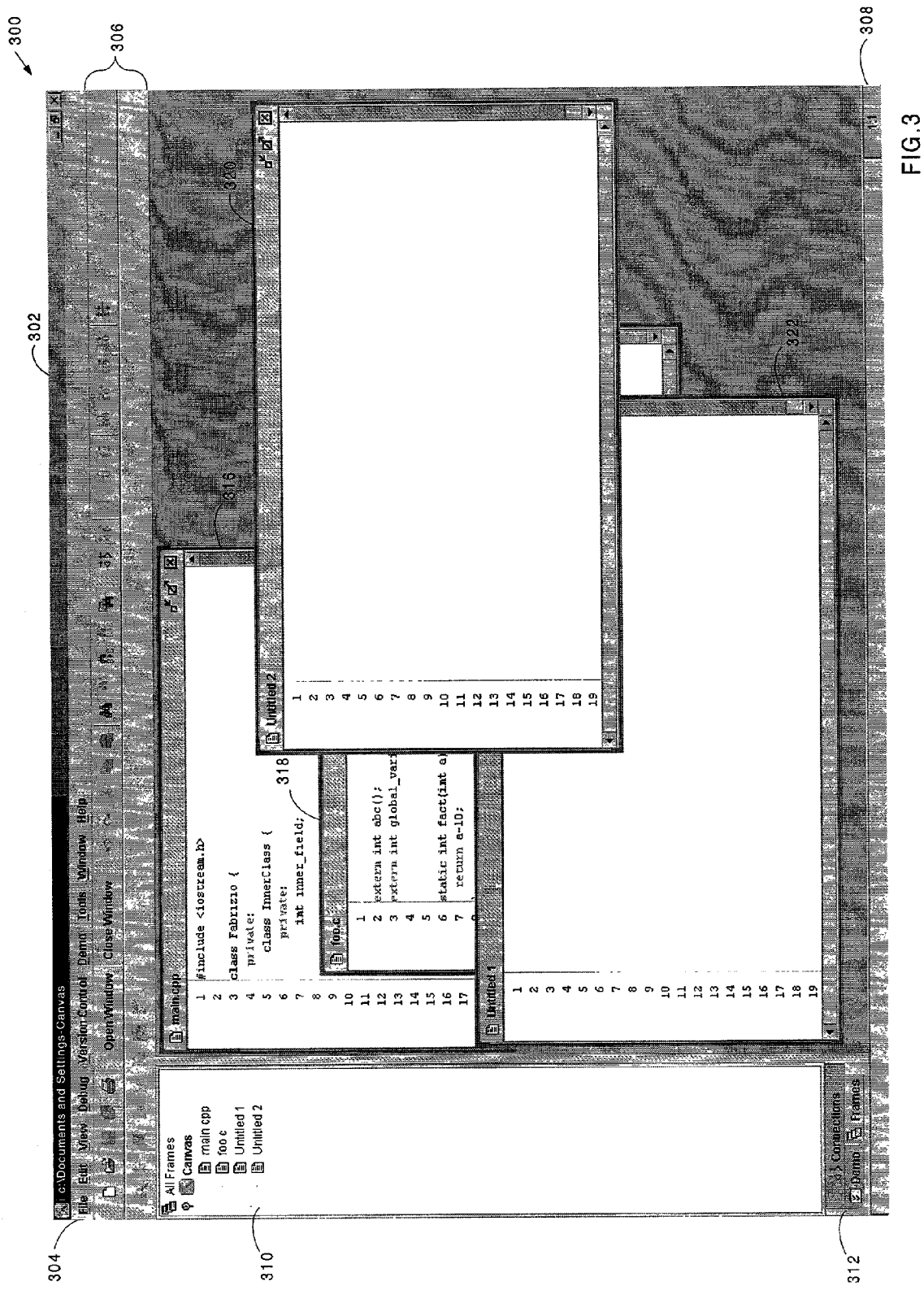

Referring to FIG. 3, a user interface 300 presents a frame 302 controlled by the application 200. The frame 302 includes a menu bar 304, a tool bar 306, and a status bar 308. The frame 302 also contains internal windows 310 through 322 opened by the user of the application 200, an output panel 312, and a window manager panel 310. The window manager panel 310 displays a tree data structure that represents the containment of internal windows 316 through 322 inside a single frame.

The user may request to change the arrangement of internal windows 316 through 322. In one embodiment, the change requires user involvement in the window organization process. That is, the user needs to issue a request to open a new frame and then perform an operation controlling the movement of an internal window into the new frame. This embodiment is illustrated in FIGS. 4-6, 7A and 7B.

Figure 4:
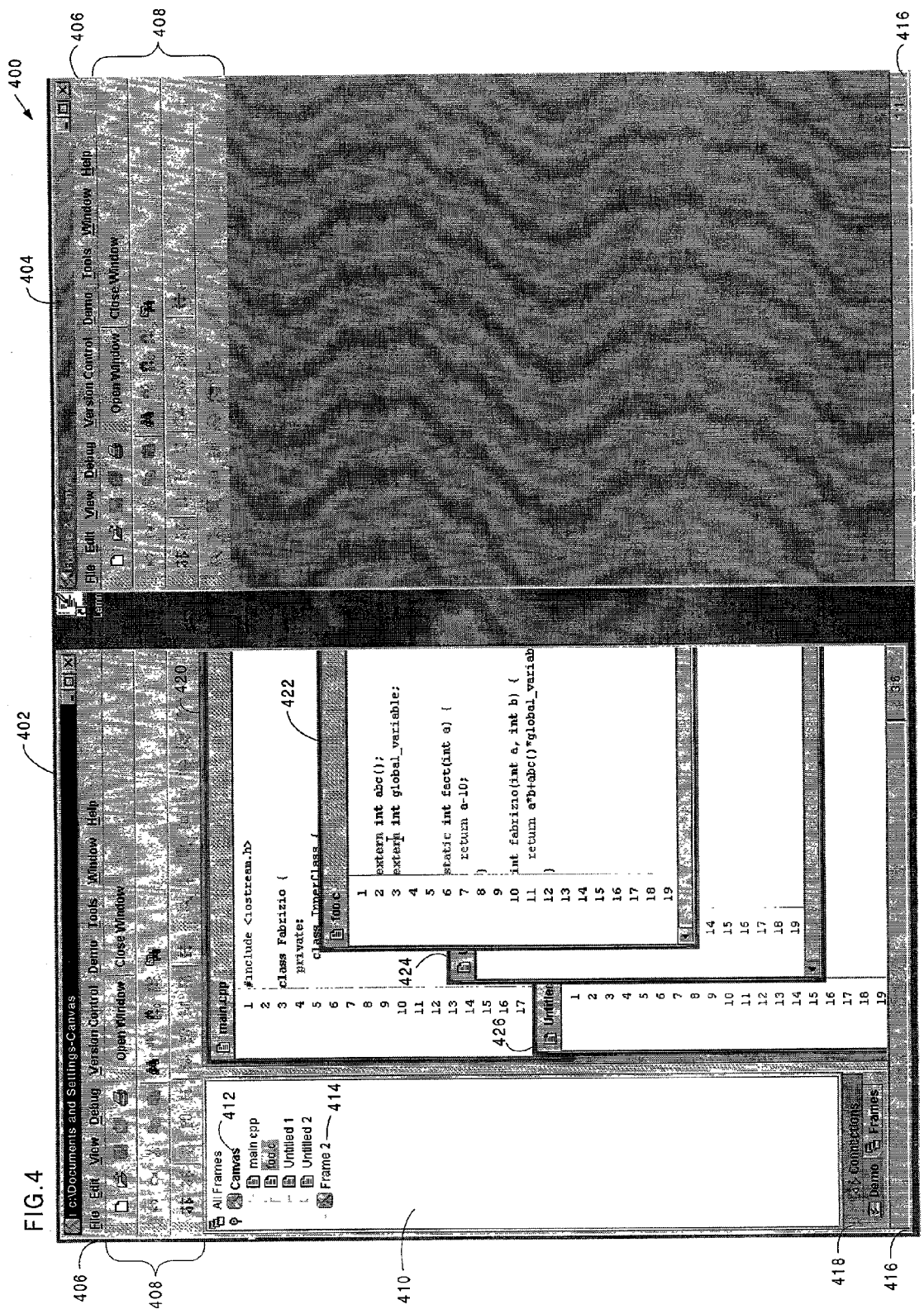

Referring to FIG. 4, a new frame 404 is created in response to the user request. The new frame 404 may be opened on the same desktop and/or terminal as the initial frame 402, or alternatively on a different desktop, monitor and/or computer. The new frame 404 has the same menu bar 406, tool bar 408 and status bar 416 as the initial frame 420. The tree data structure displayed on a window manager panel 410 has a node 414 representing the new frame 404.

Figure 5:
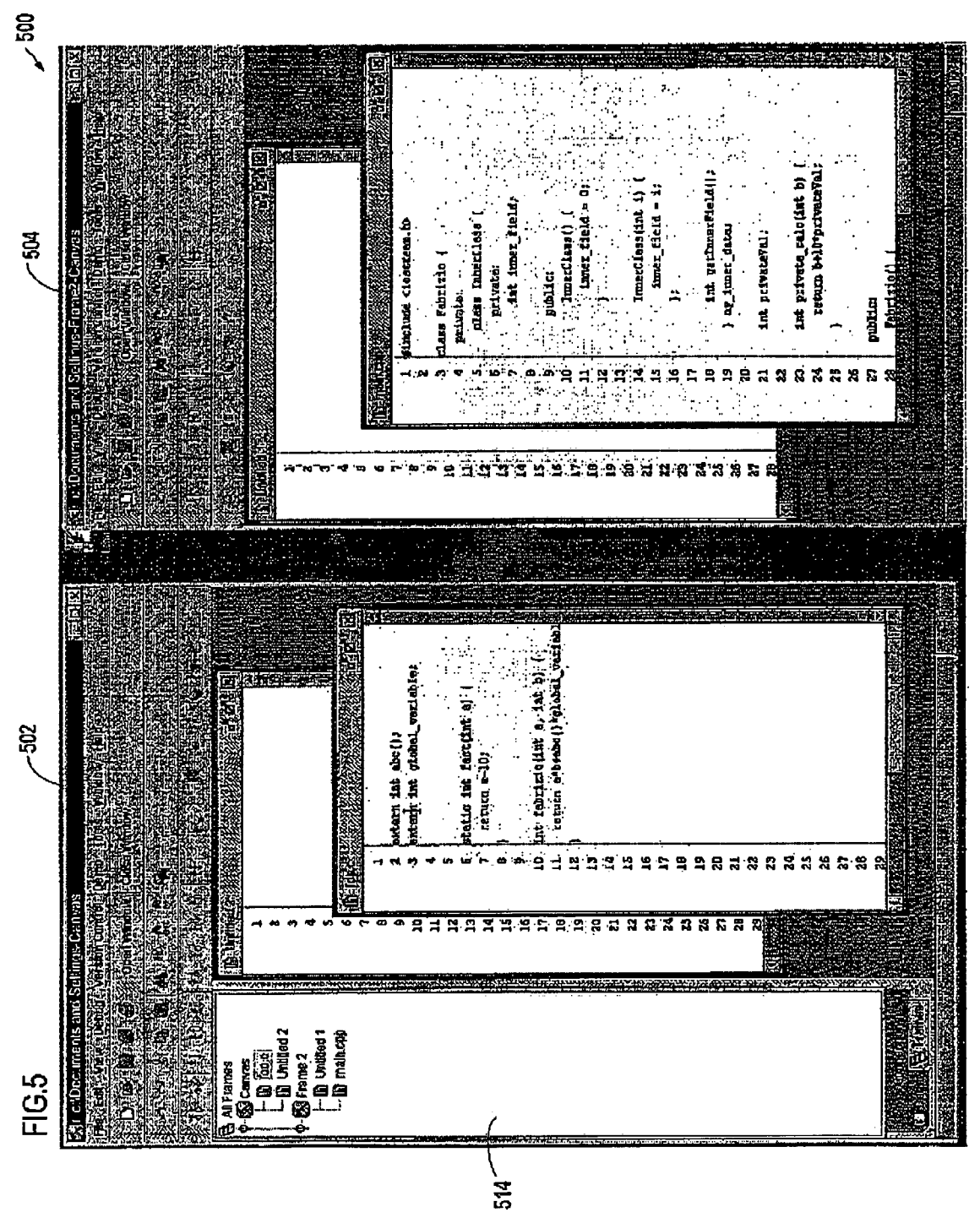

Referring to FIG. 5, the new frame 504 includes internal windows 510 and 512 that were moved from the frame 502 in response to user operations and a window manager panel 514. Example of the user operations may be dragging nodes 524 and 526 and dropping them underneath a top-level node 518.

Figure 6:
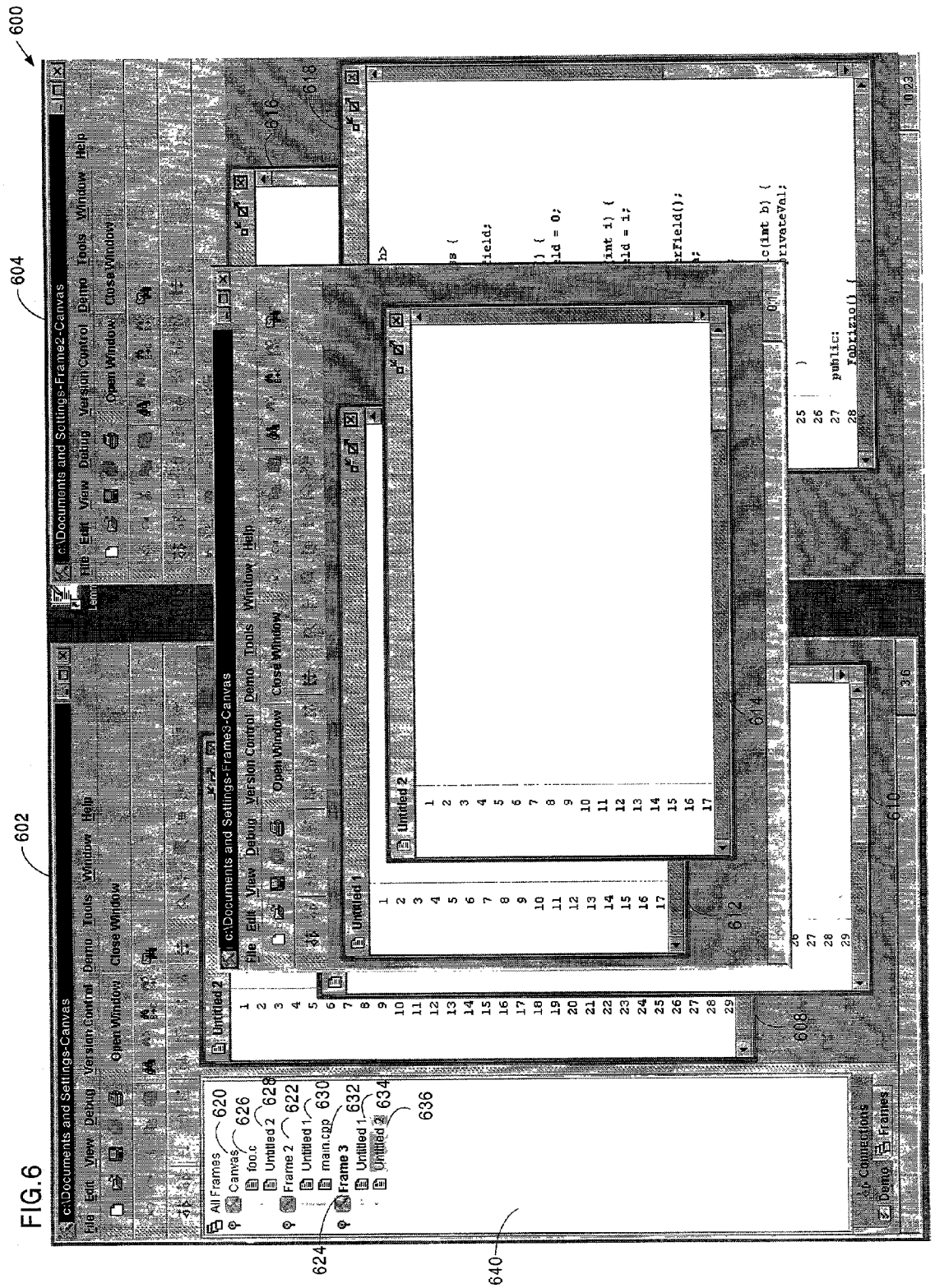

Referring to FIG. 6, a third frame 606 is created in response to a user request. The frame 606 contains two internal windows 612 and 614. The tree data structure displayed on a window manager panel 640 has top-level nodes 620, 622 and 624 representing frames 602, 604 and 606 and corresponding nodes 626 through 636 representing the internal windows.

Figure 7A:
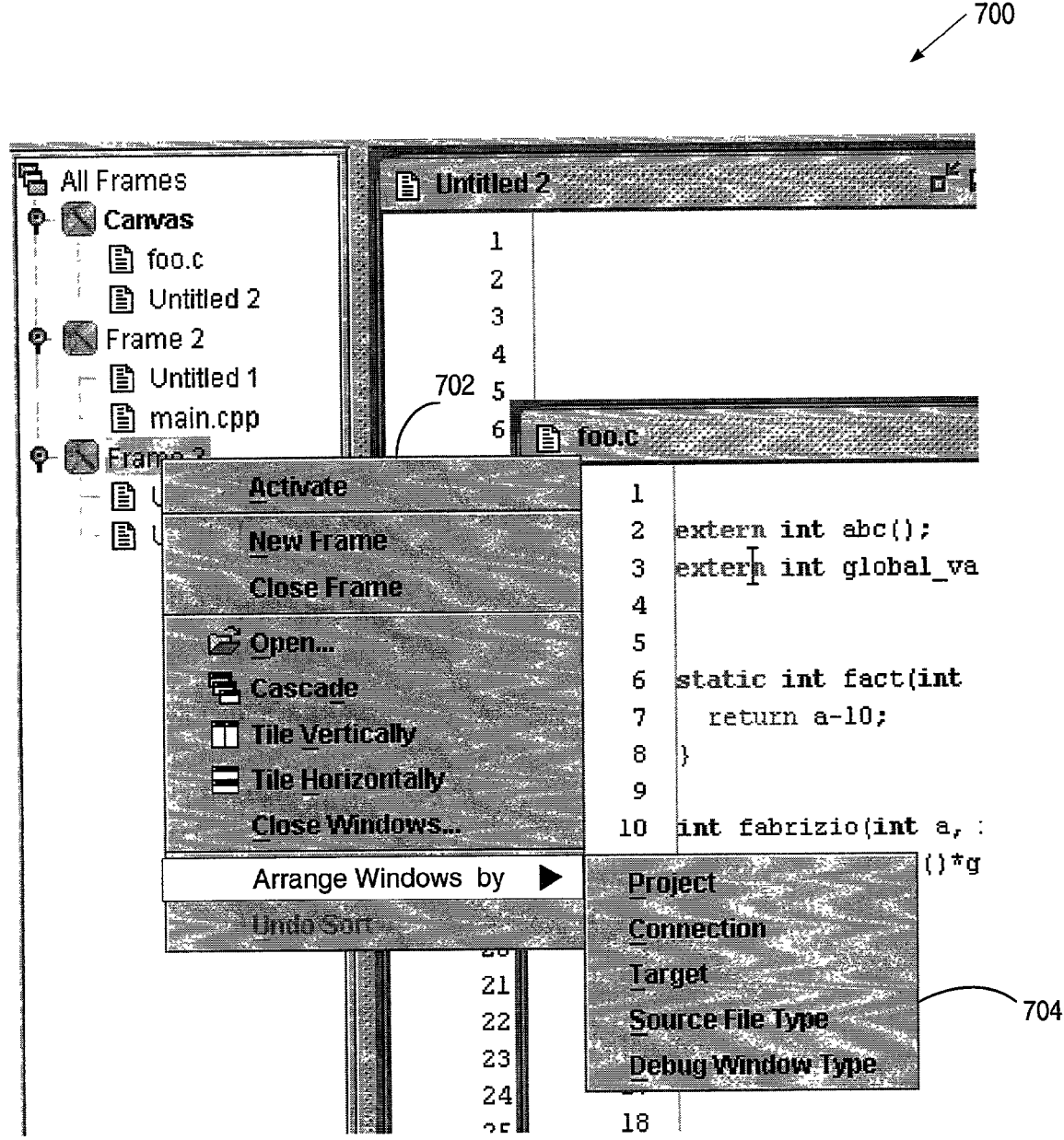
Figure 7B:
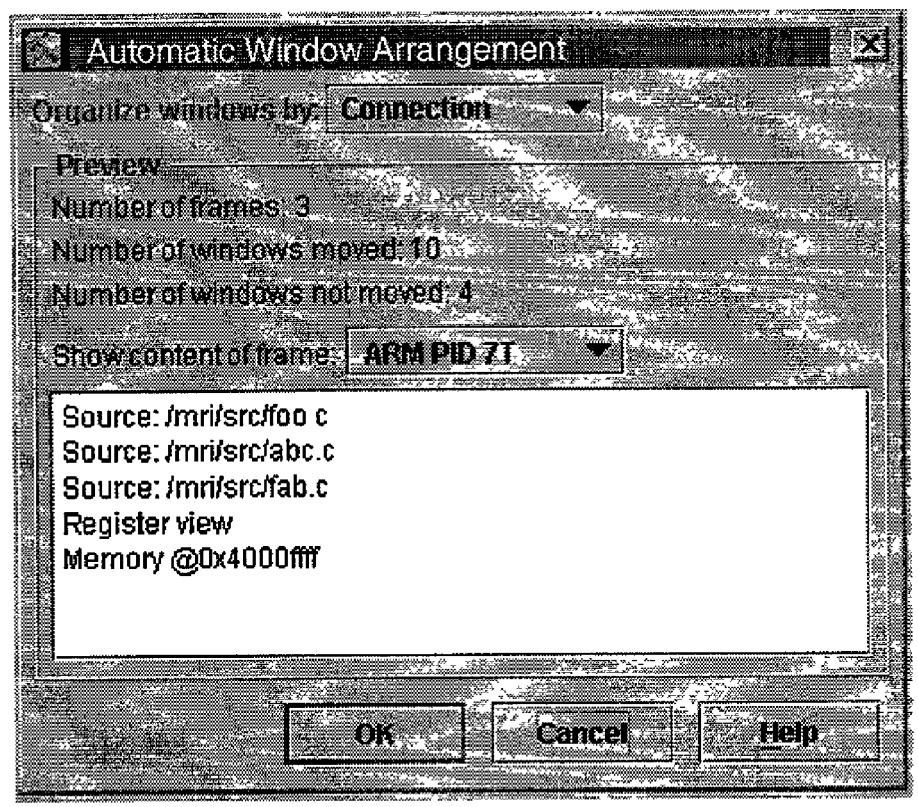

In another embodiment, the change in the window arrangement is performed automatically upon receiving a user request to organize the internal windows. FIGS. 7A and 7B illustrate the automatic arrangement of internal windows according to one embodiment of the present invention.

Referring to FIG. 7A, a dialog box 702 and a set of criteria 704 allow the user to request an automatic arrangement of internal windows. Once the user requests the automatic arrangement and specifies a criterion, a dialog box 720 of FIG. 7B may appear to provide an opportunity for the user to preview the resulting window organization. Using the OK button of the dialog box 702, the user can either accept or reject the new window arrangement, and then the new arrangement will either be performed or canceled.

After the internal windows are automatically arranged, the user may reinstate the initial organization of the internal windows by selecting an undo option on the dialog box 702 of FIG. 7A.

In one embodiment, if the user decides to close a frame via a close button, the frame will be closed if it has no internal windows or panels. If the frame has internal windows or panels, they will be automatically moved to the remaining frame. If more than one frame remains, a dialog box will appear to allow the user to choose frames to which the internal windows and panels are to be moved.

In one embodiment, the application frames and internal windows will close if (1) the user selects File/Exit from a menu bar contained in any frame; (2) the user enters the command "exit" on the output panel located in any frame; or (3) the user closes the last frame.

In one embodiment, the user can issue a request pertaining to the organization of the internal windows via the Windows menu appearing when the user selects "Windows" on the menu bar.

In another embodiment, the user can issue a request pertaining to the organization of the internal windows by manipulating nodes of the tree data structure displayed in the window manager panel. For example, the user can drag and drop nodes representing internal windows from one high-level node representing a frame to another high-level node, or the user can click on a node and a menu will appear to allow the user to create a new frame, close an existing frame, move internal windows, request automatic arrangement of internal windows, etc. The options of the menu will vary depending on whether the node is a frame node, an internal window node, a panel node, etc. The menu may also appear if the user clicks outside of the tree data structure on the window manager panel.

In yet another embodiment, the user can issue a request pertaining to the organization of the internal windows by clicking on the internal window area with the right mouse button. Then, the menu will appear that may include additional options, e.g., an option permitting the user to bring up to the screen the frame containing the frame manager panel or an option allowing the user to switch directly to the next or previous frame for a quick navigation through the frames.

In still another embodiment, a set of commands is defined to allow the user to perform the above operations by entering these commands on the output panel contained in any of the frames. In addition, the user can define keyboard shortcuts to perform the above operations.

A method and system for organizing windows associated with an application have been described. The specific arrangements and methods described here are illustrative of the principles of this invention. Numerous modifications in form and detail may be made by those skilled in the art without departing from the true spirit and scope of the invention. Although this invention has been shown in relation to a particular embodiment, it should not be considered so limited. Rather it is limited only by the appended claims.

What is claimed is:

1. A method of organizing data on a computer display, comprising:
    displaying a plurality of internal open windows contained within a first frame controlled by an application;
    opening in response to a user request a second frame controlled by the application;
    displaying a data structure indicating which windows are open in the first and second frame;
    dragging and dropping at least one of the plurality of internal open windows from the first frame to the second frame, the first frame and the second frame each including a tool bar for invoking tools of the application and a menu bar providing a menu of user selections; and
    altering the displayed data structure to show that the at least one of the plurality of internal open windows was moved from the first frame to the second frame.

2. The method of claim 1 wherein the first frame is displayed on a first display device and the second frame is displayed on a second display device.

3. The method of claim 1 wherein the first frame and the second frame are displayed on a first display device.

4. The method of claim 1 further including a status bar positioned on each of the first and second frames.

5. The method of claim 1 further comprising:
    moving the window manager panel from the one of the first frame or the second frame to the other of the first frame or the second frame in response to a user command.

6. The method of claim 1 further comprising organizing the plurality of internal windows contained within the first frame based on a predefined criterion.

7. The method of claim 6 wherein the predefined criterion is a user defined criterion.

8. The method of claim 6 wherein the predefined criterion is a user defined criterion.

9. The method of claim 6 wherein the predefined criterion is any one of a project, a connection, a target component, a source file type, and a debug file type.

10. The method of claim 6 further comprising:
    restoring an original organization of the plurality of the internal windows upon receiving an undo command from a user.

11. The method of claim 1 in which each frame displays at least one open window, the display of any open window being constrained within the bounds of the corresponding frame.

12. The method of claim 11 in which the open window displays a document including computer code or debugging information.

13. The method of claim 1 in which both the first frame and the second frame include the same user interface features.

14. The method of claim 1 in which moving the at least one of the plurality of internal windows from the first frame to the second frame includes moving at least one rectangular window having a title bar and minimize and close window controls from the first frame to the second frame, the window maintaining its title bar and minimize the close window controls in the second frame.

15. The method of claim 1 further comprising closing one of the frames, the closing including automatically moving windows that are open in the frame to be closed into a remaining frame.

16. A method comprising:
    receiving a user request to organize a plurality of open internal windows associated with an application into a set of frames, the set of frames including more than one frame having a tool bar for invoking tools of the application and a menu bar providing a menu of user selections;

organizing the plurality of the open internal windows into the set of frames in accordance with a specified criterion;

displaying the open internal windows within the set of frames; and displaying within one of the set of frames a data structure indicating which windows are open in each of the frames of the set, the displayed data structure changing to reflect when windows are moved between frames.

17. The method of claim 16 wherein the criterion is any one of a project, a connection, a target component, a source file type, and a debug file type.

18. The method of claim 16 further comprising:

restoring an original organization of the plurality of the internal windows upon receiving an undo command from a user.

19. The method of claim 16 further comprising:

displaying a preview of the window organization to a user prior to organizing the plurality of windows.

20. The method of claim 16 wherein the set of frames is displayed on two or more display devices.

21. The method of claim 16 wherein the set of frames includes more than one frame having a status bar.

22. The method of claim 16 in which the data structure indicating which windows are open in each of the frames of the set is displayed in a windows manager pane and further comprising:

moving the window manager pane between frames within the set of frames.

23. The method of claim 16 wherein displaying the internal windows within the set of frames includes displaying the internal windows as open windows.

24. An apparatus comprising:

a user input processor to receive a user request pertaining to a plurality of internal windows contained within a first frame controlled by an application;

a frame manager to open a second frame controlled by the application and to move at least one of the plurality of internal windows to the second frame, the first and second frames each including a tool bar for invoking tools of the application and a menu bar providing a menu of user selections, and a user interface module that displays a data structure indicating which windows are open in the first and second frames, the user interface module altering the data structure to reflect movement of a window moves between the first and second frame.

25. The apparatus of claim 24 wherein the first frame is displayed on a first display device and the second frame is displayed on a second display device.

26. The apparatus of claim 24 wherein the first frame and the second frame are displayed on a first display device.

27. The apparatus of claim 24 wherein the first and second frames each include a status bar.

28. The apparatus of claim 24 in which the user interface module creates a tree data structure representing the organization of the internal windows within the first and second frames and displays the tree data structure in a window manager panel contained within the first frame.

29. The apparatus of claim 28 wherein the user request pertaining to the plurality of internal windows contained within the first frame is a request to organize the plurality of internal windows contained within the first frame based on a predetermined criterion.

30. An apparatus comprising:

a user input processor to receive a user request to organize a plurality of internal windows associated with an application into a set of frames, and to identify a criterion controlling the organization of the plurality of internal windows;

a frame manager to organize the plurality of the internal windows into the set of frames in accordance with the criterion, the set of frames including more than one frame including a tool bar for invoking tools of the application and a menu bar providing a menu of user selections; and a user interface module that displays a data structure indicating which windows are open in the frames in the set, the user interface module altering the data structure when a window is moved between the frames in the set to reflect the move.

31. The apparatus of claim 30 wherein the criterion is any one of a project, a connection, a target component, a source file type, and a debug file type.

32. The apparatus of claim 30 wherein the frame manager is further to restore an original organization of the plurality of the internal windows upon receiving an undo command from a user.

33. The apparatus of claim 30 wherein the set of frames is displayed on two or more display devices.

34. The apparatus of claim 30 further comprising:

a user interface module to display a tree data structure representing the window organization in a window manager panel contained in any frame within the set of frames.

* * * * *